(12) United States Patent
Miyajima et al.

(10) Patent No.: US 8,265,847 B2
(45) Date of Patent: Sep. 11, 2012

(54) SPEED CONTROL DEVICE FOR VEHICLE

(75) Inventors: Takayuki Miyajima, Anjo (JP);
Yoshiyuki Yasui, Nagoya (JP); Hideaki Koto, Kariya (JP); Hiroyuki Kodama, Kariya (JP); Masaki Maruyama, Aichi (JP)

(73) Assignee: Aisin AW Co., Ltd. (JP)

( * ) Notice: Subject to any disclaimer, the term of this patent is extended or adjusted under 35 U.S.C. 154(b) by 469 days.

(21) Appl. No.: 12/557,255

(22) Filed: Sep. 10, 2009

(65) Prior Publication Data

US 2010/0082212 A1    Apr. 1, 2010

(30) Foreign Application Priority Data

Sep. 29, 2008    (JP) .................................. 2008-249580

(51) Int. Cl.
*G05D 1/00*    (2006.01)
(52) U.S. Cl. .......................................... 701/72; 701/93
(58) Field of Classification Search .................... 701/70, 701/72, 93
See application file for complete search history.

(56) References Cited

U.S. PATENT DOCUMENTS

| | | | |
|---|---|---|---|
| 6,067,497 A | 5/2000 | Sekine et al. | 701/93 |
| 6,141,617 A | 10/2000 | Matsuda et al. | 701/72 |
| 6,169,952 B1 | 1/2001 | Matsuda et al. | 701/72 |
| 6,208,927 B1 | 3/2001 | Mine et al. | 701/70 |
| 7,734,404 B2 * | 6/2010 | Shiiba et al. | 701/70 |
| 7,751,962 B2 * | 7/2010 | Yamamura et al. | 701/93 |
| 7,792,624 B2 * | 9/2010 | Nakamura et al. | 701/72 |
| 7,831,366 B2 * | 11/2010 | Imai et al. | 701/70 |
| 2004/0111209 A1 | 6/2004 | Kagawa et al. | 701/93 |
| 2005/0240334 A1 * | 10/2005 | Matsumoto et al. | 701/93 |
| 2006/0190158 A1 | 8/2006 | Shiiba et al. | 701/70 |
| 2007/0150157 A1 | 6/2007 | Lee et al. | 701/93 |
| 2007/0208485 A1 * | 9/2007 | Yamamura et al. | 701/93 |
| 2008/0078600 A1 | 4/2008 | Inoue et al. | 180/170 |
| 2009/0187322 A1 | 7/2009 | Yasui et al. | 701/70 |

FOREIGN PATENT DOCUMENTS

JP    7-125565    5/1995

* cited by examiner

*Primary Examiner* — Joseph Rocca
(74) *Attorney, Agent, or Firm* — Bacon and Thomas, PLLC

(57) ABSTRACT

A speed control device includes: a reference point setting unit that sets, based on shape and position of a curve in advance of a vehicle, first and second reference points within the curve, the second reference point being nearer the curve exit than the first reference point; a distance calculating unit that calculates, based on the vehicle location and the reference points, first and second distances, between the vehicle and the first and second reference points, respectively; a target speed determination unit that determines, based on the curve shape and the first and second distances, the first and second target vehicle speeds to be maintained, respectively, before and after passing the first reference point; and a speed control unit that controls the speed of the vehicle based on the target speeds and the detected speed of the vehicle.

13 Claims, 10 Drawing Sheets

F I G . 7
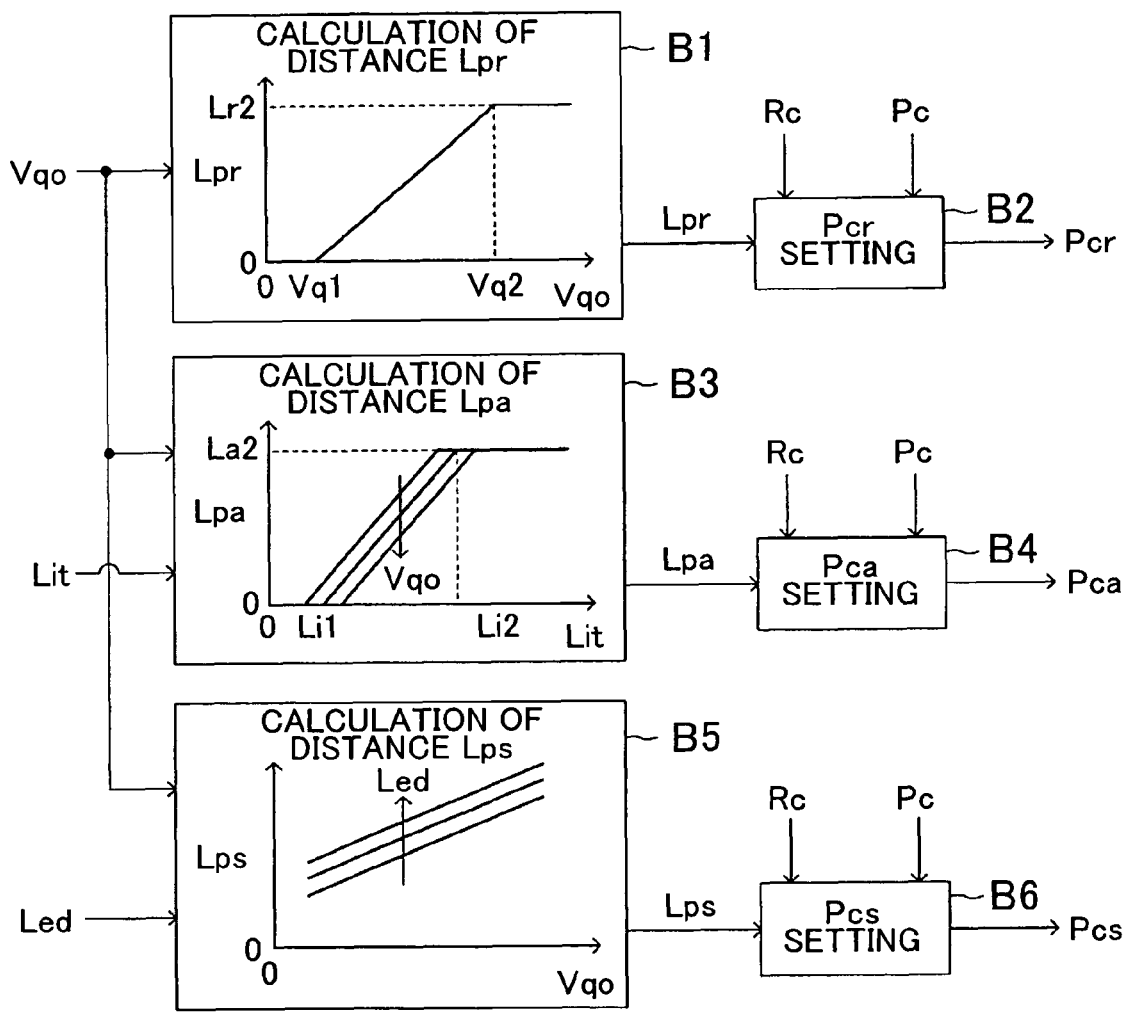

SPEED CONTROL DEVICE FOR VEHICLE

INCORPORATION BY REFERENCE

The disclosure of Japanese Patent Application No. 2008-249580 filed on Sep. 29, 2008, including the specification, drawings and abstract is incorporated herein by reference in its entirety.

BACKGROUND OF THE INVENTION

The present invention relates to a speed control device for a vehicle, and more particularly to a speed control device for a vehicle that controls a speed at which the vehicle runs along a curve.

DESCRIPTION OF THE RELATED ART

Various types of speed control devices are known as those performing such speed control as described above. Japanese Patent Application Publication No. JP-A-7-125565 describes an automatic cruise controller that "calculates, based on an host vehicle position P0 and a look-ahead distance L, a node N0 included in the range within the look-ahead distance L on a first curve as an assumed host vehicle position P1, and using the assumed host vehicle position P1 as a reference point, determines the possibility of passing through the curve and sets a target vehicle speed VS required to pass through the curve."

In the device described in the document mentioned above, the node serving as the reference point (assumed host vehicle position P1) is shifted over time as the vehicle travels. Consequently, the above described "determination on possibility of passing" and "setting of target vehicle speed" are performed discontinuously. As a result, the speed may not be controlled smoothly when the vehicle runs along a curve (the speed of the vehicle does not change smoothly).

SUMMARY OF THE INVENTION

It is an object of the present invention to provide a speed control device for a vehicle that is capable of achieving smooth speed control when the vehicle passes through a curve.

A speed control device for a vehicle according to a first aspect of the present invention includes a vehicle speed acquiring unit that acquires a speed of a vehicle, a vehicle position acquiring unit that acquires a position of the vehicle, and a curve acquiring unit that acquires a shape and a position of a single curve located in front of the vehicle.

The speed control device for a vehicle according to the first aspect of the present invention includes a reference point setting unit that sets, based on the curve shape and the curve position, a first reference point within the curve and a second reference point within the curve on the side nearer to the exit of the curve than the first reference point. Here, the reference point setting unit is preferably structured so as to determine an interval having a minimum radius of curvature within the curve based on the curve shape and the curve position, and to set the first and the second reference points based on an end point of the interval (at least one of both end points on the entrance side and the exit side of the curve). Moreover, the first and the second reference points may be set at the entrance point and the exit point, respectively, of an interval in which the speed of the vehicle should be maintained at an appropriate vehicle speed (a speed required for the vehicle to appropriately pass through the curve).

The speed control device for a vehicle according to the first aspect of the present invention includes a distance calculating unit that calculates, based on the vehicle position and the first reference point, a first distance serving as a distance of an interval between the vehicle and the first reference point, and also calculates, based on the vehicle position and the second reference point, a second distance serving as a distance of an interval between the vehicle and the second reference point.

The speed control device for a vehicle according to the first aspect of the present invention includes a target vehicle speed determination unit that determines a first target vehicle speed (characteristics) based on the curve shape and the first distance, and a second target vehicle speed (characteristics) based on the curve shape and the second distance, determines the first target vehicle speed (characteristics) as a target vehicle speed (characteristics) until the vehicle passes the first reference point, and determines the second target vehicle speed (characteristics) as the target vehicle speed (characteristics) after the vehicle passes the first reference point.

Here, the first target vehicle speed may be determined so as to decrease as the first distance decreases. In addition, the second target vehicle speed may be determined so as to be constant at the appropriate vehicle speed required for the vehicle to appropriately pass through the curve, regardless of the second distance. The appropriate vehicle speed may be determined, for example, based on the minimum radius of curvature of the curve. If the first and the second target vehicle speeds are determined in this manner, the first and the second reference points can be referred to as a point at which the vehicle completes deceleration (deceleration reference point) and a point at which the vehicle completes maintaining the vehicle speed (maintenance reference point), respectively.

In addition, the speed control device for a vehicle according to the first aspect of the present invention includes a vehicle speed control unit that controls the speed of the vehicle based on the target vehicle speed (characteristics) and the vehicle speed. Here, the vehicle speed may be controlled either so as to coincide with the target vehicle speed (characteristics), or so as not to exceed the target vehicle speed (characteristics) (using the target vehicle speed as an upper limit value).

In the above-described speed control device for a vehicle according to the first aspect of the present invention, it is more preferable that the reference point setting unit be structured so as to set, based on the curve shape and the curve position, a third reference point within the curve on the side nearer to the exit of the curve than the second reference point, the distance calculating unit is structured so as to calculate, based on the vehicle position and the third reference point, a third distance serving as a distance of an interval between the vehicle and the third reference point, and the target vehicle speed determination unit is structured so as to determine a third target vehicle speed (characteristics) based on the curve shape and the third distance and to determine the third target vehicle speed (characteristics) as the target vehicle speed (characteristics) after the vehicle passes the second reference point.

Here, the third reference point may be set based on the end point of the interval having a minimum radius of curvature within the curve on the exit side of the curve. Moreover, the third reference point may be set at the exit point of an interval in which acceleration of the vehicle should be limited. The third target vehicle speed may be determined so as to increase as the third distance decreases. If the third target vehicle speed is determined in this manner, the third reference point can be referred to as a point at which the vehicle completes limiting the acceleration (acceleration reference point).

With the structure described above, the first and the second (and the third) reference points used for calculating the target vehicle speed are set based on the curve shape (more specifically, on the change in radius of curvature of the curve), and the reference point used for calculating the current target vehicle speed is shifted sequentially as the position of the vehicle moves ahead. As a result, smooth speed control can be achieved while the vehicle is running along the curve.

In other words, the single deceleration reference point (first reference point) and the single maintenance reference point (second reference point) (and the single acceleration reference point (third reference point)) are set (independently of nodes stored in memory in advance) within the single curve, and the speed control is performed while the vehicle is running along the curve. In this process, the operations of the "determination on possibility of passing" and the "setting of target vehicle speed" are not performed for each node, as is performed in the device described in the Japanese Patent Application Publication No. JP-A-7-125565 mentioned above. Consequently, the vehicle can pass through the single curve smoothly.

It is preferable that the above-described speed control device for a vehicle according to the first aspect of the present invention include an acceleration operating amount acquiring unit that acquires an operating amount of an acceleration operating member operated by a driver of the vehicle. In the speed control device, the target vehicle speed determination unit includes an adjusting unit that adjusts, based on the operating amount, the target vehicle speed so as to be larger when the operating amount is greater than zero than the target vehicle speed when the operating amount is zero.

In this case, the target vehicle speed can be determined to be larger as the operating amount is greater. In addition, it is preferable that the adjusting unit be structured so as to adjust the target vehicle speed so as to be larger when the operating amount is greater than zero than that when the operating amount is zero, over the whole interval of the curve (interval from start to end of speed control, that is, interval from entrance to exit of curve).

With the structure described above, when the driver performs an accelerating operation while the vehicle is running along the curve, the target vehicle speed (accordingly, an actual vehicle speed) can be made higher than that when the driver performs no accelerating operation. That is, the accelerating operation by the driver can be reflected in the speed control. Consequently, the speed control can be achieved in response to the intention of the driver to accelerate the vehicle, giving little sense of discomfort to the driver.

When the accelerating operation by the driver is reflected in the speed control in this manner, it is preferable that the target vehicle speed determination unit be structured so as to determine the target vehicle speed so that an increment from the target vehicle speed when the operating amount is zero does not exceed a predetermined upper limit. By being structured in this manner, it is possible to suppress the vehicle from being unnecessarily accelerated when the vehicle runs along the curve, thus enabling the vehicle to pass through the curve in a stable manner.

BRIEF DESCRIPTION OF THE DRAWINGS

FIG. 7 is a functional block diagram for explaining specific processing concerning calculations of reference points executed by the device shown in FIG. 1;

DETAILED DESCRIPTION OF THE EMBODIMENTS

An embodiment of a speed control device for a vehicle according to the present invention will be described below with reference to the accompanying drawings.

(Structure)

Figure 1:
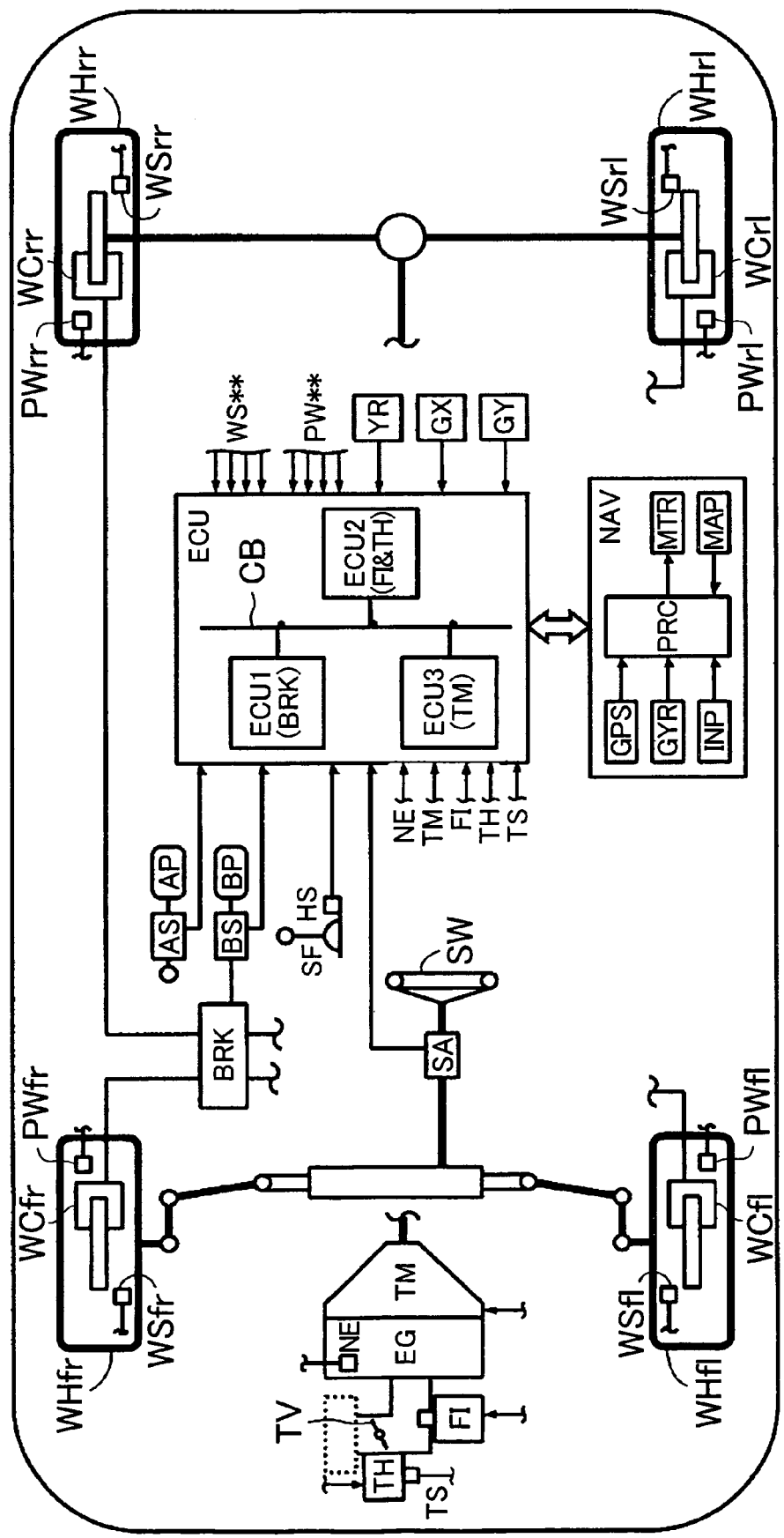
FIG. 1 is a schematic block diagram of a vehicle equipped with a speed control device for a vehicle according to an embodiment of the present invention.

FIG. 1 shows a schematic structure of a vehicle equipped with a speed control device (hereinafter referred to as "present device") according to an embodiment of the present invention. The present is equipped with an engine EG serving as a power source of the vehicle, an automatic transmission TM, a brake actuator BRK, an electronic control unit ECU, and a navigation device NAV.

The engine EG is, for example, an internal combustion engine. That is, an opening of a throttle valve TV is regulated by a throttle actuator TH in response to operation of an accelerator pedal (acceleration operating member) AP by a driver. A fuel injection actuator (injector) FI injects fuel of a quantity proportional to the quantity of intake air regulated depending on the opening of the throttle valve TV. As a result, an output torque is obtained depending on the operation of the accelerator pedal AP by the driver.

The automatic transmission TM is a multi-speed automatic transmission with a plurality of shift speeds, or a continuously variable transmission with no shift speeds. The automatic transmission TM is capable of changing a reduction ratio (rotational speed of EG output shaft (=TM input shaft)/rotational speed of TM output shaft) depending on an operating state of the engine EG and a position of a shift lever (shift operating member) SF, in an automatic manner (without the need of operation of the shift lever SF by the driver).

The brake actuator BRK has a known structure equipped with a plurality of solenoid valves, a hydraulic pump, a motor, and so on. In an uncontrolled state, the brake actuator BRK supplies brake pressure depending on operation of a brake pedal (brake operating member) BP by the driver to each of wheel cylinders WC at corresponding wheels WH. In a controlled state, the brake actuator BRK can regulate the brake pressure in each of the wheel cylinders WC at each of the corresponding wheels WH, independently of the operation of the brake pedal BP (and of the operation of the accelerator pedal AP).

Note that the suffix "" appended to each of the various symbols indicates to which wheel each of the symbols corresponds; that is, "fl" indicates correspondence to a front left wheel, "fr" to a front right wheel, "rl" to a rear left wheel, and "rr" to a rear right wheel. For example, the wheel cylinders WC comprehensively represent a front left wheel cylinder WCfl, a front right wheel cylinder WCfr, a rear left wheel cylinder WCrl, and a rear right wheel cylinder WCrr.

The present device is equipped with wheel speed sensors WS for detecting wheel speeds of the wheels WH; brake pressure sensors PW for detecting the brake pressures in the wheel cylinders WC; a steering wheel angle sensor SA for detecting a rotational angle (from a neutral position) of a steering wheel SW; a yaw rate sensor YR for detecting a yaw rate of a vehicle body; a longitudinal acceleration sensor GX for detecting an acceleration (deceleration) in a longitudinal direction of the vehicle body; a lateral acceleration sensor GY for detecting an acceleration in a lateral direction of the vehicle body; an engine speed sensor NE for detecting the rotational speed of the output shaft of the engine EG; an acceleration operating amount sensor AS for detecting an operating amount of the accelerator pedal (acceleration operating member) AP; a brake operating amount sensor BS for detecting an operating amount of the brake pedal BP; a shift position sensor HS for detecting the position of the shift lever SF; and a throttle valve opening sensor TS for detecting the opening of the throttle valve TV.

The electronic control unit ECU is a microcomputer for electronically controlling a power train system and a chassis system. The electronic control unit ECU is electrically connected to, or capable of communicating via a network with, the above-mentioned various actuators, the above-mentioned various sensors, and the automatic transmission TMs. The electronic control unit ECU is composed of a plurality of control units ECU1 to ECU3 that are connected to each other via a communication bus CB.

The ECU1 in the electronic control unit ECU is a wheel brake control unit, which executes brake pressure control (wheel brake control) including well-known types of control such as vehicle stability control (ESC), anti-skid control (ABS), and traction control (TCS), by controlling the brake actuator BRK based on signals from sources such as the wheel speed sensors WS, the longitudinal acceleration sensor GX, the lateral acceleration sensor GY, and the yaw rate sensor YR. In addition, the ECU1 calculates a vehicle speed Vx based on detection results (wheel speeds Vw) of the wheel speed sensors WS**.

The ECU2 in the electronic control unit ECU is an engine control unit, which executes output torque control (engine control) of the engine EG by controlling the throttle actuator TH and the fuel injection actuator FI based on signals from the acceleration operating amount sensor AS and the like.

The ECU3 in the electronic control unit ECU is an automatic transmission control unit, which executes reduction ratio control (transmission control) by controlling the automatic transmission TM based on signals from the shift position sensor HS and the like.

The navigation device NAV is equipped with a navigation processing device PRC, which is electrically connected to a vehicle position detecting unit (global positioning system) GPS, a yaw rate gyro GYR, an input section INP, a memory section MAP, and a display section (display) MTR. The navigation device NAV is electrically connected to, or capable of communicating via wireless connection with, the electronic control unit ECU.

The vehicle position detecting unit GPS is capable of detecting a position (latitude, longitude, etc.) of the vehicle by a known method using a positioning signal from an artificial satellite. The yaw rate gyro GYR is capable of detecting an angular velocity (yaw rate) of the vehicle body. The input section INP receives operational input by the driver regarding navigation functions. The memory section MAP has a variety of stored information such as map information and road information.

The navigation processing device PRC processes signals from the vehicle position detecting unit GPS, the yaw rate gyro GYR, the input section INP, and the memory section MAP in an integrated manner, and displays the result of the processing (information regarding the navigation functions) on the display section MTR.

(Outline of Speed Control by Present Device)

Figure 2:
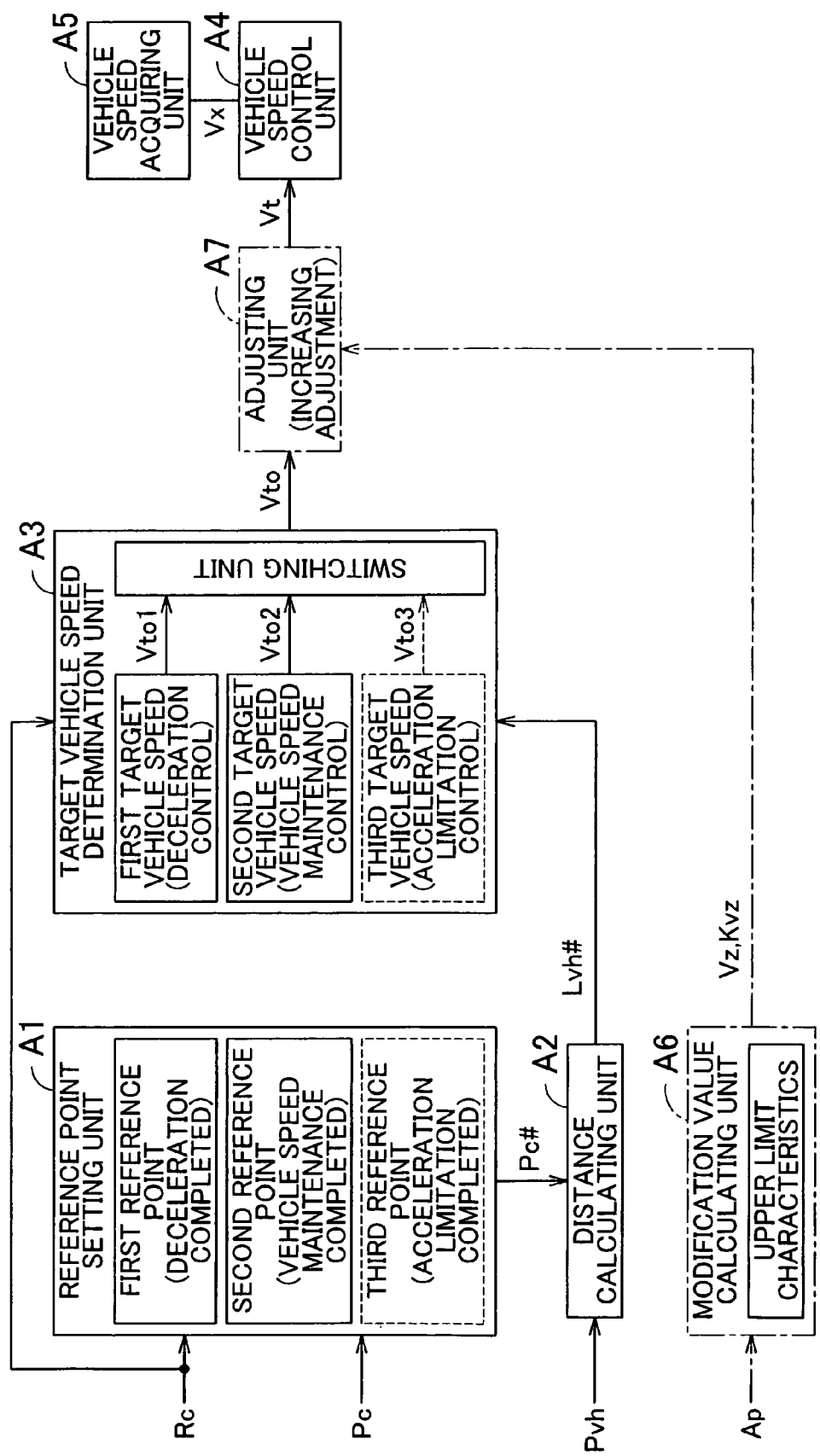
FIG. 2 is a functional block diagram for explaining an outline of speed control executed by the device shown in FIG. 1.
Figure 3:
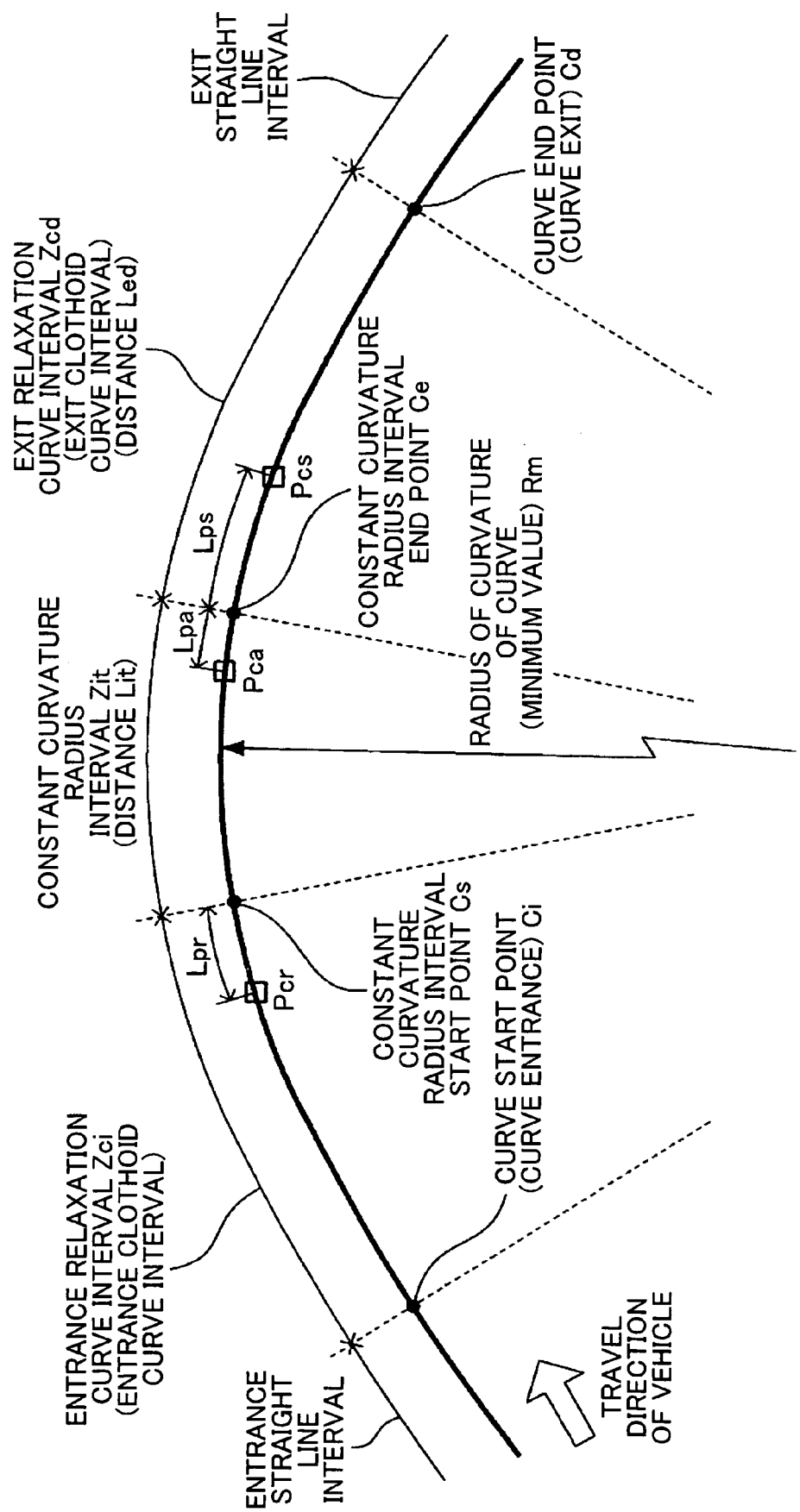
FIG. 3 is a diagram showing an example of a shape of a curve.

The outline of the speed control by the present device structured as explained above will be described below with reference to FIG. 2. The following description assumes the curve shown in FIG. 3 as a curve along which the vehicle runs. The curve shown in FIG. 3 is composed of an entrance relaxation curve interval Zci (where the radius of curvature gradually decreases as the vehicle travels ahead), a constant curvature radius interval Zit, and an exit relaxation curve interval Zcd (where the radius of curvature gradually increases as the vehicle travels ahead), in the order from a curve start point (curve entrance) Ci to a curve end point (curve exit) Cd. The relaxation curves are composed, for example, of clothoid curves. The relaxation curve intervals are provided so that the vehicle can smoothly pass through the curve without requiring a rapid steering wheel operation of the driver, by turning the steering wheel gradually and then returning the steering wheel gradually.

First, the navigation device NAV (curve acquiring unit) acquires a shape Rc of a single curve located in the forward direction of travel of the vehicle and a position Pc of the curve. In addition, the navigation device NAV (vehicle position acquiring unit) acquires a current position of the vehicle (host vehicle position) Pvh.

Based on the curve shape Rc and the curve position Pc, a reference point setting unit A1 sets a first reference point (deceleration reference point Pcr) serving as a reference for a point at which the vehicle completes deceleration and a second reference point (maintenance reference point Pca) serving as a reference for a point at which the vehicle completes maintaining the vehicle speed, within the single curve.

The second reference point Pca is set on the side farther from the vehicle (exit side of the curve) than the first reference point Pcr. Consequently, when the vehicle runs in the curve, the vehicle first passes the first reference point Pcr, and then passes the second reference point Pca. More specifically, based on the curve shape Rc, the interval having a minimum radius of curvature (interval having a constant radius of curvature) Zit is determined within the curve (refer to FIG. 3). The first reference point Pcr is set based on a start point (point on the nearest side to the vehicle) Cs of the interval Zit that is one of both end points of the interval Zit, and the second reference point Pca is set based on an end point (point on the farthest side from the vehicle) Ce of the interval Zit that is the other of the end points.

Based on the host vehicle position Pvh and the reference point Pc#, a distance calculating unit A2 calculates a distance (relative distance) Lvh# of an interval between the host vehicle position and the reference point Pc#. Here, the suffix "#" appended to each of the various symbols indicates to which of the reference points Pcr and Pca (and Pcs to be described later) each of the symbols corresponds; that is, "r" indicates correspondence to the deceleration reference point (first reference point), "a" to the maintenance reference point (second reference point), and "s" to an acceleration reference point (third reference point). For example, a relative distance Lvhr represents a distance of an interval between the host vehicle position Pvh and the deceleration reference point Pcr.

A target vehicle speed determination unit A3 determines a target vehicle speed serving as a target when the vehicle runs in the single curve. In order to determine the target vehicle speed, calculation maps each of which represents the relation between the corresponding relative distance Lvh# and the target vehicle speed are prepared based on the curve shape Rc. Specifically, a calculation map for a first target vehicle speed Vto1 based on the first reference point Pcr for executing deceleration control to decelerate the vehicle, and a calculation map for a second target vehicle speed Vto2 based on the second reference point Pca for executing vehicle speed maintenance control to maintain the vehicle speed are prepared. Into these calculation maps, the corresponding relative distances Lvh# (relative distances Lvh# based on the same corresponding reference points) calculated by the distance calculating unit A2 are entered to calculate the first and the second target vehicle speeds Vto1 and Vto2 in the host vehicle position Pvh.

In addition, the target vehicle speed determination unit A3 determines, as a target vehicle speed Vto, the first target vehicle speed Vto1 calculated based on the curve shape Rc and the relative distance (first distance) Lvhr until the vehicle passes the first reference point Pcr, by using a switching unit. Then, after the vehicle passes the first reference point Pcr, the target vehicle speed Vto is switched from the first target vehicle speed Vto1 to the second target vehicle speed Vto2 by the switching unit.

Figure 4:
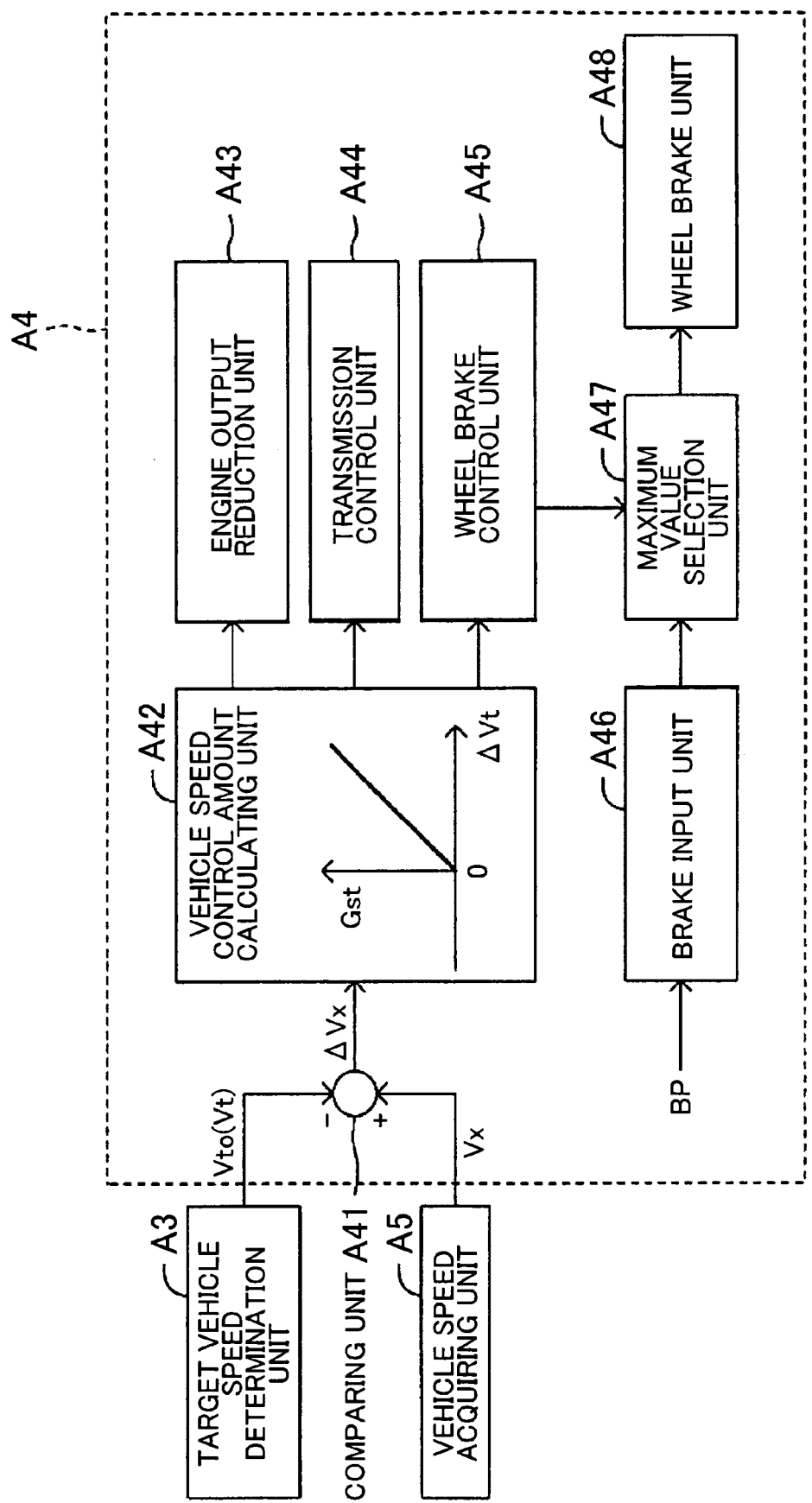
FIG. 4 is a functional block diagram for explaining the speed control executed by a vehicle speed control unit shown in FIG. 2.

A vehicle speed control unit A4 controls the speed of the vehicle based on the speed of the vehicle (vehicle speed) Vx acquired by a vehicle speed acquiring unit A5 (wheel speed sensors WS**) and on the target vehicle speed Vto (Vt to be described later) in the host vehicle position Pvh. Specifically, as shown in FIG. 4, first a comparing unit A41 calculates a difference between the vehicle speed Vx and the target vehicle speed Vto (Vt) (speed deviation $\Delta$Vx), and then a vehicle speed control amount calculating unit A42 calculates a vehicle speed control amount Gst based on the speed deviation $\Delta$Vx and the map shown in the drawing.

Based on the vehicle speed control amount Gst, the vehicle speed Vx is controlled so as not to exceed the target vehicle speed Vto (Vt to be described later) by using at least one of engine output reduction control by an engine output reduction unit A43, reduction ratio control by a transmission control unit A44, and wheel brake (brake pressure) control by a wheel brake control unit A45. As a result, the vehicle can be decelerated based on the first target vehicle speed Vto1, and then the vehicle speed can be maintained constant based on the second target vehicle speed Vto2. Note that, in the engine output reduction control, at least one of the parameters such as the opening of the throttle valve TV, an ignition timing, and a fuel injection amount is adjusted.

In addition, when a brake input unit A46 detects the operation of the brake pedal BP by the driver, a maximum value selection unit A47 selects the larger of a brake torque (brake pressure) by the wheel brake control unit A45 and a brake torque (brake pressure) by the operation of the driver, and a wheel brake unit A48 applies the selected brake torque (brake pressure). The purpose of this is to enable overriding of the brake torque by the brake operation by the driver during the vehicle curve speed control.

The reference point setting unit A1 may set, based on the curve shape Rc and the curve position Pc, a third reference point (acceleration reference point Pcs) serving as a reference for a point at which the vehicle completes limiting acceleration, within the single curve. The third reference point Pcs is set on the side farther from the vehicle (exit side of the curve) than the second reference point Pca. Consequently, when the vehicle runs in the curve, the vehicle passes the third reference point Pcs after passing the second reference point Pca. More specifically, the third reference point Pcs is set based on the above-described end point Ce of the "interval having a minimum radius of curvature Zit."

When the third reference point Pcs is set in this manner, the distance calculating unit A2 calculates, based on the host vehicle position Pvh and the third reference point Pcs, a distance (relative distance) Lvhs of an interval between the host vehicle position Pvh and the third reference point Pcs. Then, based on the curve shape Rc, the target vehicle speed determination unit A3 prepares a calculation map representing the relation between the relative distance Lvhs and a target vehicle speed Vto3. This calculation map is a map to calculate the third target vehicle speed Vto3 based on the third reference point Pcs for executing acceleration limitation control to limit the acceleration of the vehicle. The relative distance Lvhs is entered into this calculation map to calculate the third target vehicle speed Vto3 in the host vehicle position Pvh. In addition, after the vehicle passes the second reference point Pca, the target vehicle speed Vto is switched from the second target vehicle speed Vto2 to the third target vehicle speed Vto3 by the switching unit. Then, as a result of control of the vehicle speed Vx by the vehicle speed control unit A4 so as not to exceed the target vehicle speed Vto (Vt), the vehicle speed is maintained constant based on the second target vehicle speed Vto2, and then the acceleration of the vehicle is limited based on the third target vehicle speed Vto3.

As described above, a plurality of reference points used for calculation of the target vehicle speeds are set within the curve based on the change in the radius of curvature in the single curve, and the reference point and the calculation map used for calculation of the current target vehicle speed are shifted sequentially as the position of the vehicle moves ahead. Consequently, smooth speed control can be achieved while the vehicle is running along the curve.

There may be provided a modification value calculating unit A6. The modification value calculating unit A6 calculates a modification value (specifically, a modification vehicle speed Vz or a modification coefficient Kvz, to be described later) for adjusting the target vehicle speed Vto, based on the operating amount, by the driver of the vehicle, of the acceleration operating member AP (acceleration operating amount) that is acquired by the acceleration operating amount sensor AS (acceleration operating amount acquiring unit).

In the case of providing the modification value calculating unit A6, an adjusting unit A7 adjusts the target vehicle speed Vto to increase so as to obtain a target vehicle speed Vt ($\geq$Vto), based on this modification value. Here, the target vehicle speed Vt is adjusted so as to have a larger value as the acceleration operating amount Ap is greater. In addition, an upper limit characteristics (Vz1, Kv1, to be described later) can be provided for the adjustment of the target vehicle speed Vt, independently of the acceleration operating amount Ap.

Moreover, the target vehicle speed Vt can be adjusted so that the vehicle is allowed to accelerate (that is, so that the target vehicle speed Vt can be increased) even if the vehicle is running in the interval in which the radius of curvature of the curve gradually decreases (in FIG. 3, the entrance relaxation curve interval Zci in which the vehicle is decelerated by the above-described deceleration control (deceleration interval)).

In this manner, the calculation of the target vehicle speed can take into account the acceleration operating amount Ap. In this case, because acceleration of the vehicle is allowed even in the deceleration interval mentioned above, an uncomfortable feeling of the driver can be reduced. In addition, because the upper limit characteristic is provided for this adjustment of the target vehicle speed Vt, reliable vehicle curve speed control can be executed. The target vehicle speed determination unit A3, the modification value calculating unit A6, and the adjusting unit A7 described above, shown in FIG. 2, correspond to "target vehicle speed determination unit" in the present invention.

(Vehicle Curve Speed Control)

Figure 5:
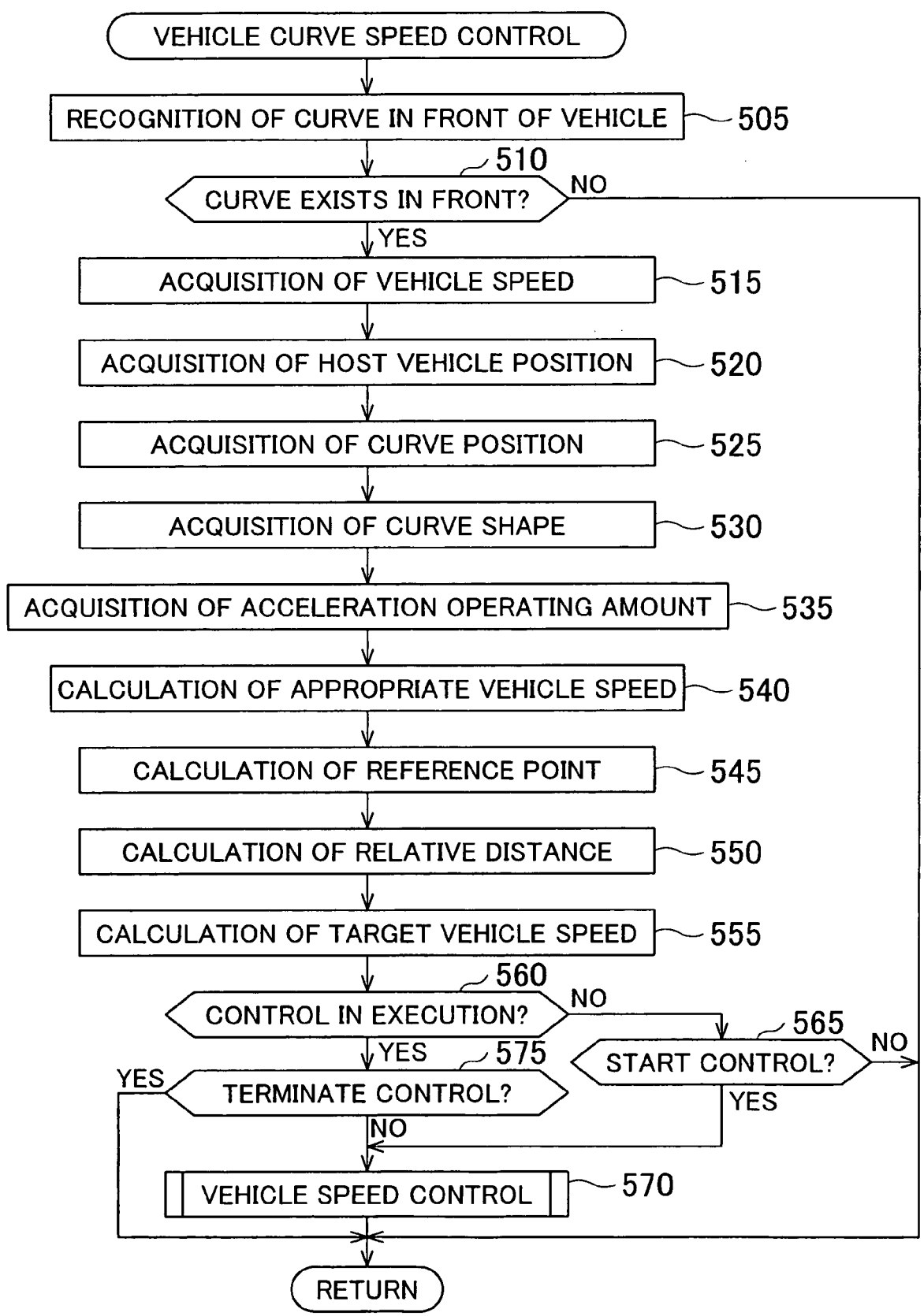
FIG. 5 is a flow chart concerning vehicle curve speed control executed by the device shown in FIG. 1.

The vehicle curve speed control serving as a specific embodiment of the speed control by the present device will be described below with reference to FIG. 5. In the vehicle curve speed control, the speed of the vehicle is controlled based on the vehicle speed Vx, the shape Rc of the curve at the nearest point in front of the vehicle, and the relative distance between the curve and the vehicle (distance between curve and vehicle) so that the vehicle can pass through the curve in a stable and appropriate manner. The vehicle curve speed control is achieved by using the above-described vehicle speed control unit A4, by which the vehicle speed is adjusted using at least one of the engine output control, the reduction ratio control, and the wheel brake control.

First, processing for recognizing the existence of a curve in front of the vehicle is performed in step 505. The recognition of the curve is performed by the navigation device NAV. In step 510, it is determined whether or not the curve exists in front of the vehicle. If it is determined that the curve exists by the determination in step 510, the processing for the vehicle curve speed control shown in the drawing from step 515 onward is started.

The vehicle speed Vx is acquired in step 515. The host vehicle position Pvh is acquired in step 520. The host vehicle position Pvh is obtained from the global positioning system GPS of the navigation device NAV.

Next, the curve position Pc at the nearest point in front of the vehicle is acquired in step 525, and the curve shape Rc is acquired in next step 530. The curve position Pc and the curve shape Rc (such as the radius of curvature of the curve) are read out from curve information stored in the map information of the navigation device NAV.

In addition, the radius of curvature of the curve can be estimated based on a line that is formed by storing in memory the positions of points (nodes) on the road in advance and connecting the points in a geometrically smooth manner (for example, refer to Japanese Patent No. 3378490).

Next, the operating amount of the accelerator pedal AP (acceleration operating amount Ap) operated by the driver is acquired in step 535, based on the output of the acceleration operating amount sensor AS.

Next, an appropriate vehicle speed Vqo serving as a vehicle speed at which the vehicle can pass through the curve in a stable and appropriate manner is calculated in step 540, based on the radius of curvature of the curve. Specifically, the appropriate vehicle speed Vqo is calculated, for example, based on the radius of curvature of the interval having a constant radius of curvature (constant curvature radius interval Zit in FIG. 3) in the curve. The appropriate vehicle speed Vqo can also be calculated based on a minimum radius of curvature Rm in the curve.

Figure 6:
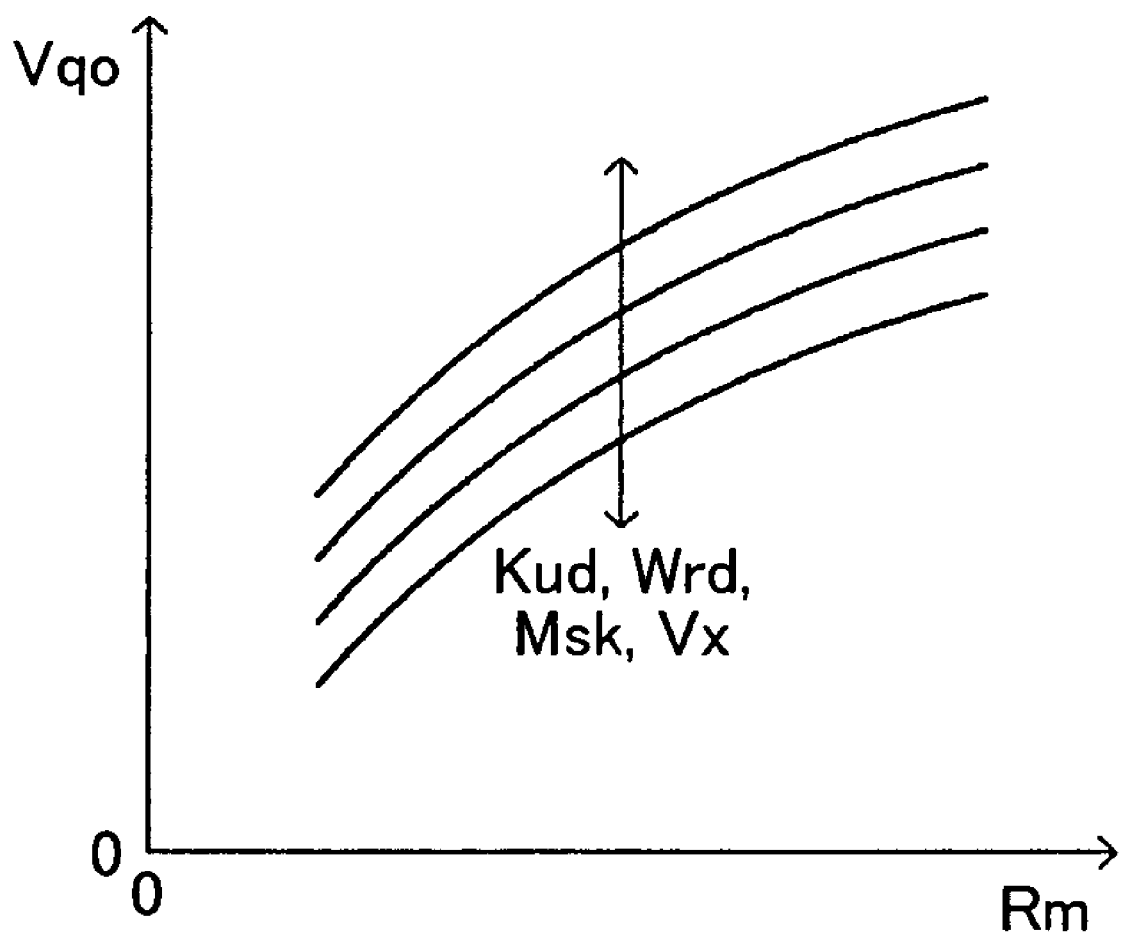
FIG. 6 is a graph showing a calculation map referred to when calculating an appropriate vehicle speed for a curve.

As shown in FIG. 6, the appropriate vehicle speed Vqo is calculated to be a larger value as the radius of curvature (minimum radius of curvature Rm) of the curve is greater. In the example shown in FIG. 6, the appropriate vehicle speed Vqo is determined so that the vehicle can pass through the curve at an approximately constant lateral acceleration, regardless of the radius of curvature.

Moreover, the appropriate vehicle speed Vqo can be adjusted based on at least one or more of an uphill/downhill gradient Kud, a road width Wrd, a forward visibility Msk, and the vehicle speed Vx. Here, if the uphill/downhill gradient Kud represents a downhill gradient, the appropriate vehicle speed Vqo is adjusted to a smaller value than that in the case of a flat road. If the uphill/downhill gradient Kud represents an uphill gradient, the appropriate vehicle speed Vqo is adjusted to a larger value than that in the case of the flat road. The appropriate vehicle speed Vqo is adjusted to a smaller value as the road width Wrd is smaller. The appropriate vehicle speed Vqo is adjusted to a smaller value as the forward visibility Msk is worse. In addition, the appropriate vehicle speed Vqo is adjusted to a smaller value as the vehicle speed Vx is higher.

Next, the reference points are calculated in step 545. The reference points are points that serve as references for specifying a vehicle speed characteristic to be achieved by the vehicle curve speed control. The reference points include the deceleration reference point Pcr serving as a landmark for an entrance point of an interval in which the vehicle speed is to be maintained at the appropriate vehicle speed Vqo; the maintenance reference point Pca serving as a landmark for an exit point of the interval in which the vehicle speed is to be maintained at the appropriate vehicle speed Vqo; and the acceleration reference point Pcs serving as a landmark for an exit point of an interval in which acceleration is to be limited (refer to FIG. 9, etc. to be described later).

The specific processing in the step 545 will be described below with reference to FIG. 7. First, in a block B1, a distance Lpr (refer to FIG. 3) for determining the deceleration reference point Pcr is calculated based on the appropriate vehicle speed Vqo. Specifically, the distance Lpr is calculated so that Lpr=0 if the value Vqo is a predetermined value Vq1 or less, or the distance Lpr increases as the value Vqo increases if Vqo>Vq1.

In a block B2, the deceleration reference point Pcr is determined based on the curve position Pc, the curve shape Rc, and the distance Lpr. The deceleration reference point Pcr is set at a point on the curve that is nearer to the curve entrance Ci than the point Cs (i.e., referring to FIG. 3, the entrance point of the interval having a constant radius of curvature in the curve (the point nearest to the vehicle in the interval having a constant radius of curvature), or the point nearest to the vehicle at which the radius of curvature in the curve is minimum) by the distance Lpr. Consequently, it can also be said that the point Pcr is determined based on the curve shape Rc, the distance Lpr, and the point Cs.

The purpose for setting the deceleration reference point Pcr in this manner is to take into consideration the case in which information such as the map information includes errors. That is, by setting the point Pcr that corresponds to the entrance point of the interval in which the vehicle speed is to be maintained at the appropriate vehicle speed Vqo at the point nearer to the curve entrance Ci than the point Cs by the distance Lpr, the deceleration by the vehicle curve speed control can be started at an earlier time. As a result, it can be suppressed from occurring caused by the existence of the errors mentioned above that the actual point at which the vehicle speed starts to be maintained at the appropriate vehicle speed Vqo is set at a point beyond (on the side farther from the vehicle than) the point Cs.

Note that the distance Lpr may be a constant value. The deceleration reference point Pcr can also be set at the point Cs (the entrance point of the interval having a constant radius of curvature in the curve, or the point at which the radius of curvature in the curve is minimum). The point Cs is determined based on the curve shape Rc and the curve position Pc.

In a block B3, a distance Lpa for determining the maintenance reference point Pca (refer to FIG. 3) is calculated based on the appropriate vehicle speed Vqo and a distance Lit of the constant curvature radius interval (refer to FIG. 3). Specifically, the distance Lpa is calculated so that Lpa=0 if the distance Lit is a predetermined value Li1 or less, or the distance Lpa increases as the distance Lit increases if Lit>Li1. In addition, the distance Lpa is calculated to be a smaller value as the value Vqo is greater. Note that there may be a case in which the interval Zit does not exist (Lit=0) depending on the curve shape. In this case, the point Cs and the point Ce coincide with each other.

In a block B4, the maintenance reference point Pca is determined based on the curve position Pc, the curve shape Rc, and the distance Lpa. The maintenance reference point Pca is set at a point on the curve that is nearer to the curve entrance Ci than the point Ce (i.e., referring to FIG. 3, the exit point of the interval having a constant radius of curvature in the curve (the point farthest from the vehicle in the interval having a constant radius of curvature)) by the distance Lpa. Consequently, it can also be said that the point Pca is determined based on the curve shape Rc, the distance Lpa, and the point Ce.

The purpose for setting the maintenance reference point Pca in this manner is to reflect the intention of the driver to accelerate the vehicle earlier toward the exit of the curve after the vehicle speed has been maintained at the appropriate vehicle speed Vqo. In addition, the distance Lpa is calculated to be a small value if the appropriate vehicle speed Vqo is large, thereby suppressing the acceleration of the vehicle from being started at an early time. As a result, a stable running of the vehicle is ensured when the vehicle speed is large.

Note that the distance Lpa can be calculated based on only one of the distance Lit of the constant curvature radius interval and the appropriate vehicle speed Vqo. The distance Lpa can also be a constant value. It is also possible to set the maintenance reference point Pca at the point Ce (the exit point of the interval having a constant radius of curvature in the curve). The point Ce is determined based on the curve shape Rc and the curve position Pc.

In a block B5, a distance Lps for determining the acceleration reference point Pcs (refer to FIG. 3) is calculated based on the appropriate vehicle speed Vqo and a distance Led. The distance Led is a distance of the exit relaxation curve interval (refer to FIG. 3). Specifically, the distance Lps is calculated so as to increase as the value Vqo increases. In addition, the distance Lps is calculated to be a larger value as the distance Led is greater.

In a block B6, the acceleration reference point Pcs is determined based on the curve position Pc, the curve shape Rc, and the distance Lps. The acceleration reference point Pcs is set at a point on the curve that is nearer to the curve exit Cd than the point Ce (i.e., referring to FIG. 3, the exit point of the interval having a constant radius of curvature in the curve (the point farthest from the vehicle in the interval having a constant radius of curvature)) by the distance Lps. Consequently, it can also be said that the point Pcs is determined based on the curve shape Rc, the distance Lps, and the point Ce.

The purpose for setting the acceleration reference point Pcs in this manner is to ensure a stable running of the vehicle by suppressing an excessive acceleration from occurring in a predetermined interval immediately after the acceleration is allowed heading toward the exit of the curve (that is, in a predetermined interval after the reference point Pca). In addition, the distance Lps is calculated to be a large value if the appropriate vehicle speed Vqo is large, thereby increasing the distance in which the acceleration is limited. As a result, a stable running of the vehicle is ensured when the vehicle speed is high. Moreover, the distance Lps is calculated to be a larger value as the distance Led is greater. As a result, in a predetermined fraction of interval on the entrance side of the exit relaxation curve interval, the acceleration can be limited to ensure a stable running of the vehicle.

Note that the distance Lps can be calculated based on only one of the distance Led of the exit relaxation curve interval and the appropriate vehicle speed Vqo. The distance Lps can also be a constant value. It is also possible to set the maintenance reference point Pca at the point Ce (the exit point of the interval having a constant radius of curvature in the curve). The point Ce is determined based on the curve shape Rc and the curve position Pc. The calculation of the reference points in step 545 of FIG. 5 has been described above.

Referring again to FIG. 5, the relative distances is calculated in step 550, and the target vehicle speed is calculated in next step 555. The relative distances are distances of intervals between curves and the vehicle. As each of the relative distances, the relative distance Lvh# of the interval between the host vehicle position Pvh and the corresponding reference point Pc# is calculated. In addition, the target vehicle speed is a target to which the vehicle speed is to be limited (upper limit of vehicle speed) by the vehicle curve speed control, and is calculated as the target vehicle speed Vt in the host vehicle position Pvh.

The suffix "#" appended to each of the various symbols indicates to which of the reference points Pcr, Pca, and Pcs each of the symbols corresponds; that is, "r" indicates correspondence to the deceleration reference point, "a" to the maintenance reference point, and "s" to the acceleration reference point. For example, the relative distance Lvhr represents the distance of the interval between the host vehicle position Pvh and the deceleration reference point Pcr.

The specific processing in steps 550 and 555 will be described below with reference to FIG. 8. First, in a block B7, the relative distance Lvhr serving as a distance of the interval between the host vehicle position Pvh and the reference point Pcr is calculated based on the host vehicle position Pvh and the deceleration reference point Pcr.

In a block B8, the first target vehicle speed Vto 1 in the host vehicle position Pvh is calculated based on a characteristics map for the first target vehicle speed Vto1 corresponding to the relative distance Lvhr. The first target vehicle speed Vto1 is a target vehicle speed of the vehicle curve speed control for the period until the vehicle reaches the point Pcr. The first target vehicle speed Vto1 is set so as to decrease as the distance Lvhr decreases, and then so that Vto1=Vqo at the point where Lvhr=0 (that is, the value Vto1 reaches the appropriate vehicle speed Vqo at the point Pcr).

Here, the characteristics of the first target vehicle speed Vto1 can be set so that the deceleration applied to the position (distance) for the above-described target vehicle speed Vto1 takes a constant value Gi. Note that although the characteristics of speed change applied to the position (distance) is actually represented by a curve in the case of a constant acceleration, the speed change is represented by a straight line to simplify the explanation in FIG. 8. The same applies also to the drawings described below.

In a block B9, a relative distance Lvha serving as a distance of the interval between the host vehicle position Pvh and the reference point Pca is calculated based on the host vehicle position Pvh and the maintenance reference point Pca. In a block B10, the second target vehicle speed Vto2 in the host vehicle position Pvh is calculated based on a characteristics map for the second target vehicle speed Vto2 corresponding to the relative distance Lvha. The second target vehicle speed Vto2 is a target vehicle speed of the vehicle curve speed control for the period until the vehicle reaches the point Pca after passing the point Pcr. The second target vehicle speed Vto2 is set so as to be constant (Vto2=Vqo) regardless of the distance Lvha.

In a block B11, the relative distance Lvhs serving as a distance of the interval between the host vehicle position Pvh and the reference point Pcs is calculated based on the host vehicle position Pvh and the acceleration reference point Pcs. In a block B12, the third target vehicle speed Vto3 in the host vehicle position Pvh is calculated based on a characteristics map for the third target vehicle speed Vto3 corresponding to the relative distance Lvhs. The third target vehicle speed Vto3 is a target vehicle speed of the vehicle curve speed control for the period until the vehicle reaches the point Pcs after passing the point Pca.

The third target vehicle speed Vto3 is set so that Vto3=Vqo at the point where Lvhs=Lps (that is, the value Vto3 reaches the appropriate vehicle speed Vqo at the point Pca), and then so as to increase as the distance Lvhs decreases. Here, the characteristics of the third target vehicle speed Vto3 can be set so that the acceleration applied to the position (distance) for the above-described third target vehicle speed Vto3 takes a constant value Go.

In a block B13, a switching unit selectively determines one of the target vehicle speeds Vto1, Vto2, and Vto3 as the target vehicle speed Vto based on the host vehicle position Pvh and the point Pc#. Specifically, the target vehicle speed Vto is determined to be the value Vto1 when the host vehicle position Pvh is located on the side nearer to the entrance of the curve than the point Pcr, the target vehicle speed Vto is determined to be the value Vto2 when the position Pvh is located between the point Pcr and the point Pca, and the target vehicle speed Vto is determined to be the value Vto3 when the position Pvh is located between the point Pca and the point Pcs. In other words, the target vehicle speed Vto is shifted sequentially from the value Vto 1 to the value Vto2, and from the value Vto2 to the value Vto3, as the vehicle moves ahead. That is, the point serving as a reference for the vehicle curve speed control (reference point) is shifted sequentially from the point Pcr to the point Pca, and from the point Pca to the point Pcs, following the position of the vehicle.

In a block B14, the modification vehicle speed Vz is calculated based on the operating amount Ap of the acceleration operating member AP operated by the driver that is acquired by the acceleration operating amount sensor AS (acceleration operating amount acquiring unit). The modification vehicle speed Vz is calculated to be "0" when the acceleration operating amount Ap is Ap1 (predetermined value) or less, and calculated so as to increase as the amount Ap increases when Ap>Ap1. In addition, the modification vehicle speed Vz can have an upper limit value Vz1 so that Vz=Vz1 (predetermined value) when the operating amount Ap is Ap2 (predetermined value) or more.

In a block B15, an adding unit calculates the target vehicle speed Vt (=Vto+Vz) in the host vehicle position Pvh, by adding the modification vehicle speed Vz to the target vehicle speed Vto that has been determined through selection as described above. Because the target vehicle speed Vt is calculated by increasing the target vehicle speed Vto by the modification vehicle speed Vz based on the acceleration operating amount Ap in the manner described above, the intention of the driver for acceleration can be reflected in the vehicle curve speed control. In addition, unnecessary acceleration of the vehicle can be suppressed by providing the upper limit value Vz1. The calculation of the relative distances and the calculation of the target vehicle speed in steps 550 and 555, respectively, shown in FIG. 5 have been described above.

Referring again to FIG. 5, in step 560, it is subsequently determined whether or not the vehicle curve speed control is in execution, and if the vehicle curve speed control is not in execution, it is determined whether or not a control start condition is satisfied in step 565. The control start condition is satisfied when the current vehicle speed Vx of the vehicle has exceeded the target vehicle speed Vt (calculated based on the target vehicle speed Vto1) in the host vehicle position Pvh. In other words, the control start condition is satisfied when the actual vehicle speed becomes higher compared with the characteristics of the target vehicle speed Vt applied to the position (distance).

When this control start condition is satisfied, the vehicle curve speed control is started and executed in step 570. The vehicle curve speed control controls the current vehicle speed Vx so as not to exceed the target vehicle speed Vt in the host vehicle position Pvh.

That is, first of all, the vehicle is decelerated according to the target vehicle speed Vt(=Vto1+Vz) that is calculated based on the target vehicle speed Vto1. Then, after the host vehicle position Pvh has reached the point Pcr (the vehicle passes the point Pcr), the vehicle speed is adjusted according to the target vehicle speed Vt(=Vto2+Vz) that is calculated based on the target vehicle speed Vto2 (maintained at the appropriate vehicle speed Vqo if Vz=0). After the host vehicle position Pvh has reached the point Pca (the vehicle passes the point Pca), the acceleration of the vehicle is limited according to the target vehicle speed Vt(=Vto3+Vz) that is calculated based on the target vehicle speed Vto3, heading toward the exit of the curve.

During the period in which the deceleration control for the curve is executed as described above, it is determined in step 575 whether or not a control end condition is satisfied. The control end condition is satisfied when the host vehicle position Pvh has reached the point Pcs (when the vehicle passes the point Pcs). When this control end condition has become satisfied, the vehicle curve speed control is terminated. That is, the limitation of acceleration is canceled, and a normal driving condition (condition under which the vehicle accelerates or decelerates in response to an accelerating or decelerating operation) is started.

An example of vehicle speed change by the above-described vehicle curve speed control will be described below with reference to FIG. 9. In the example shown in FIG. 9, the deceleration reference point Pcr (first point) is set on the side nearer by the distance Lpr to the entrance of the curve than the point Cs that is on the side nearest to the vehicle in the interval having the minimum radius of curvature within the curve, and the maintenance reference point Pca (second point) is set on the side nearer by the distance Lpa to the entrance of the curve than the point Ce that is on the side farthest from the vehicle in the interval having the minimum radius of curvature within the curve. Moreover, the acceleration reference point Pcs (third point) is set on the side nearer to the exit of the curve than the point Ce by the distance Lps.

The appropriate vehicle speed Vqo is calculated based on the minimum radius of curvature Rm of the curve. The target vehicle speed Vto1 (refer to line segment l1-l2), which serves as a target vehicle speed when the vehicle approaches to the point Pcr on the near side of the point Pcr, is set by using the point (Pcr, Vqo) as a base point. The target vehicle speed Vto1 can be set so as to decrease at the constant deceleration (deceleration Gi) for the position (distance).

In addition, the target vehicle speed Vto2 (refer to line segment l2-l3), which serves as a target vehicle speed when the vehicle approaches to the point Pca after passing the point Pcr, is set between the point Pcr and the point Pca. The second target vehicle speed Vto2 is set so as to be constant (Vto2=appropriate vehicle speed Vqo) regardless of the position (distance).

Moreover, based on the point Pca, the point Pcs, and the appropriate vehicle speed Vqo, the target vehicle speed Vto3 (refer to line segment l3-l4), which serves as a target vehicle speed when the vehicle approaches to the point Pcs after passing the point Pca, is set between the point Pca and the point Pcs. The target vehicle speed Vto3 can be set so as to increase at the constant acceleration (acceleration Go) for the position (distance). The above-described characteristics of the target vehicle speed Vto that are composed of the target vehicle speeds Vto1, Vto2, and Vto3 are characteristics of the target vehicle speed Vt when the driver performs no accelerating operation (Ap=0).

This target vehicle speed Vto is adjusted based on the accelerating operation by the driver. That is, the modification vehicle speed Vz calculated based on the acceleration operating amount Ap that has been acquired by the acceleration operating amount sensor AS (acceleration operating amount acquiring unit) is added to the target vehicle speed Vto (target vehicle speed Vto1, Vto2, or Vto3), and the target vehicle speed Vt(=Vto+Vz) is adjusted so as to increase in response to the increase in the acceleration operating amount Ap. In this process, the modification vehicle speed Vz is limited to the upper limit value Vz1 regardless of the acceleration operating amount Ap by the driver, thereby setting an upper limit guard (upper limit characteristics Vtm1, Vtm2, and Vtm3 represented by dashed-dotted line m1-m2-m3-m4 in FIG. 9) to the target vehicle speed Vt.

For example, if the driver performs no accelerating operation (Ap=0), the modification vehicle speed Vz equals to 0. Consequently, the target vehicle speed Vt is determined in response to the host vehicle position Pvh in accordance with the characteristics (l1-l2-l3-l4) composed of the target vehicle speeds Vto1, Vto2, and Vto3. On the other hand, if the driver performs an accelerating operation in which the acceleration operating amount Ap is kept constant (the modification vehicle speed Vz by the amount Ap is at a constant value Vza), the target vehicle speed Vt is determined in response to the host vehicle position Pvh in accordance with the characteristics (n1-n2-n3-n4) obtained by shifting upward by the value Vza the characteristics (l1-l2-l3-l4) composed of the target vehicle speeds Vto1, Vto2, and Vto3.

Figure 9:
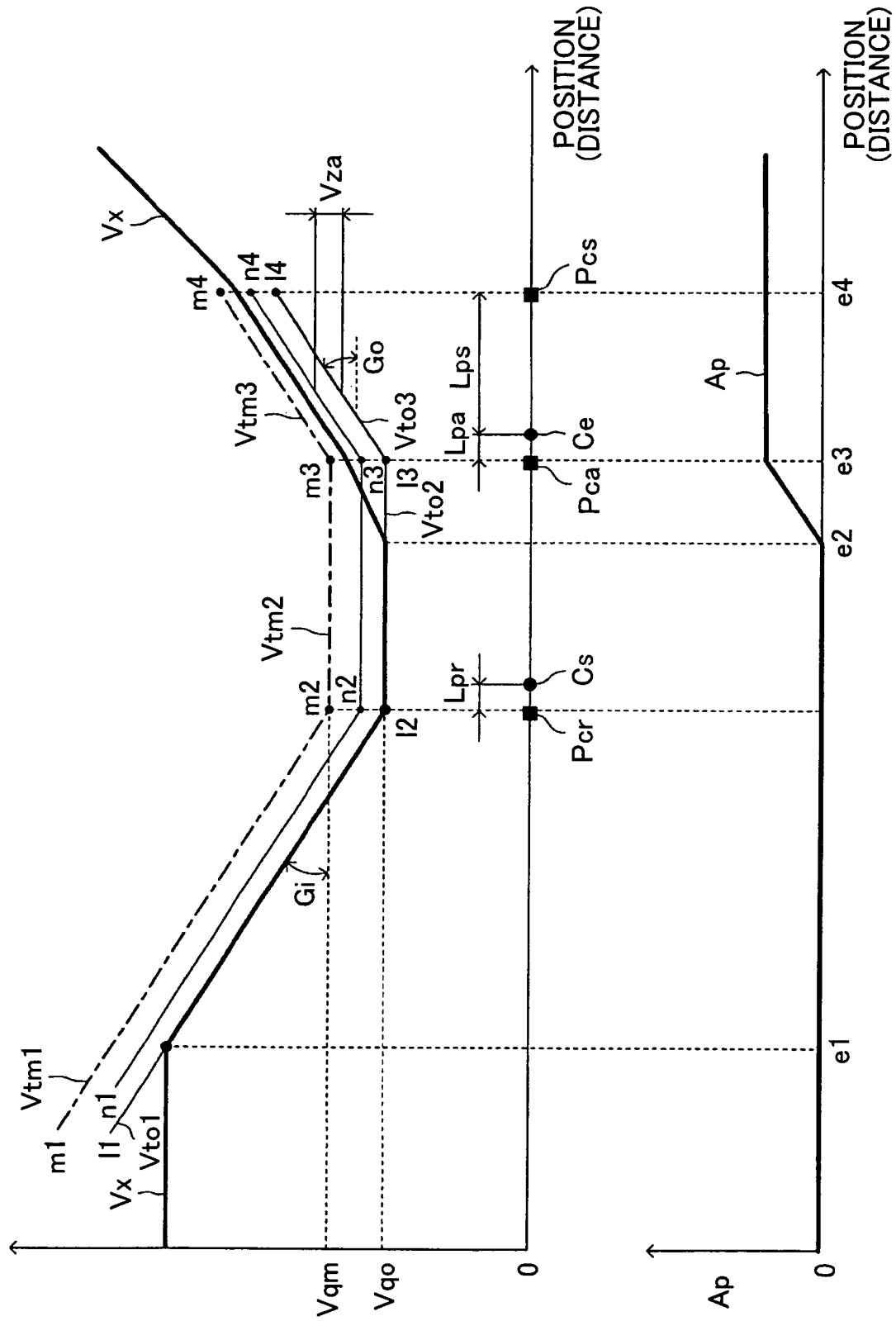
FIG. 9 is a diagram showing an example of vehicle speed change by the vehicle curve speed control.

Description will be made below regarding an example of vehicle speed change by the vehicle curve speed control when the acceleration operating amount Ap changes as shown in FIG. 9, that is, when the driver performs no accelerating operation when entering the curve, and then starts the accelerating operation midway in the curve (between the points Pcr and Pca). The change in the vehicle speed is shown by a thick solid line.

On the near side of the point e1, the curve is recognized, and the vehicle is running toward the point Pcr. Based on the point Pcr and the target vehicle speed Vto1 that is set depending on the appropriate vehicle speed Vqo, it is determined whether or not the above-described control start condition for the vehicle curve speed control is satisfied. The vehicle curve speed control is started at the point e1 at which the actual vehicle speed Vx exceeds the target vehicle speed Vt (because Ap=0, Vz=0 and therefore Vt=Vto1) in the host vehicle position Pvh. Then, the vehicle is decelerated so that the vehicle speed does not exceed the target vehicle speed Vt(=Vto1+Vz=Vto1).

After the vehicle passes the point Pcr, the target vehicle speed Vt is switched from (Vto1+Vz) to (Vto2+Vz). As a result, the acceleration of the vehicle is limited so that the vehicle speed does not exceed the speed (Vqo+Vz). Until a point e2 is reached, the acceleration of the vehicle is limited so that the vehicle speed does not exceed the appropriate vehicle speed Vqo, because Ap=0 (Vz=0).

When the driver starts to operate the acceleration operating member AP at the point e2, the modification vehicle speed Vz is calculated to be a value larger than "0", and the target vehicle speed Vt(=Vto2+Vz) is increased from the appropriate vehicle speed Vqo by the modification vehicle speed Vz. Consequently, the acceleration of the vehicle is allowed by an amount of the modification vehicle speed Vz, thereby reducing the uncomfortable feeling of the driver.

After the vehicle passes the point Pca, the target vehicle speed Vt is switched from (Vto2+Vz) to (Vto3+Vz). As a result, the acceleration of the vehicle is limited so that the vehicle speed does not exceed the speed (Vto3+Vz). At this stage, the target vehicle speed Vt(=Vto3+Vz) is increased from the target vehicle speed Vto3 by the modification vehicle speed Vz, because the driver is performing the accelerating operation. In this manner, the acceleration of the vehicle is allowed, but the level of the acceleration is limited. Then, when the vehicle passes the point Pcs, the vehicle curve speed control is terminated. As a result, the above-described limitation of acceleration is canceled.

As described above, with the speed control device for a vehicle according to the embodiment of the present invention, in the vehicle curve speed control, the first reference point Pcr serving as a reference for the point at which the vehicle completes deceleration, the second reference point Pca serving as a reference for the point at which the vehicle completes maintaining the vehicle speed, and the third reference point Pcs serving as a reference for the point at which the vehicle completes limiting the acceleration are set within the curve. The relative distance Lvh# of each interval between the host vehicle position Pvh and the corresponding reference point Pc# is calculated. Until the vehicle passes the first reference point Pcr, the first target vehicle speed Vto1 calculated based on the relative distance Lvhr is determined as the target vehicle speed Vto. After the vehicle passes the first reference point Pcr, the second target vehicle speed Vto2 calculated based on the relative distance Lvha is determined as the target vehicle speed Vto. After the vehicle passes the second reference point Pca, the third target vehicle speed Vto3 calculated based on the relative distance Lvhs is determined as the target vehicle speed Vto. In addition, if the driver performs no accelerating operation (acceleration operating amount Ap=0), the vehicle speed Vx is adjusted so as not to exceed the target vehicle speed Vto in the host vehicle position.

In this manner, the reference point and the calculation map used for calculation of the current target vehicle speed are shifted sequentially as the position of the vehicle moves ahead in the curve. Consequently, smooth speed control can be achieved while the vehicle is running along the curve.

Moreover, if the driver performs the accelerating operation (acceleration operating amount Ap>0), the modification vehicle speed Vz based on the acceleration operating amount Ap is added to the value Vto to determine the target vehicle speed Vt(=Vto+Vz). Then, the vehicle speed is adjusted so as not to exceed the target vehicle speed Vt in the host vehicle position.

As a result, because the acceleration operating amount Ap is taken into account when calculating the target vehicle speed Vt, the intention of the driver for acceleration is reflected in the vehicle curve speed control over the whole interval of the curve (interval from start to end of the vehicle curve speed control). Consequently, the uncomfortable feeling of the driver is reduced. Particularly, the vehicle is allowed to accelerate even in the deceleration interval (from the control start point to the point Pcr) or in the vehicle speed maintenance interval (from the point Pcr to the point Pca) of the vehicle curve speed control. Consequently, the vehicle curve speed control conforms to the feeling of the driver. Moreover, because the upper limit characteristic Vtm is provided for the target vehicle speed Vt, unnecessary acceleration of the vehicle is suppressed so that the vehicle can pass through the curve in a stable manner.

The operations and effects of the above-described embodiment will be additionally described below. The single deceleration reference point Pcr, the single maintenance reference point Pca, and the single acceleration reference point Pcs are set (independently of nodes stored in memory in advance) within the single curve, and the vehicle curve speed control is executed. In this process, the operations of the "determination on possibility of passing" and the "setting of target vehicle speed" are not performed for each node, as in the device described in Japanese Patent Application Publication No. JP-A-7-125565 mentioned above. Consequently, the vehicle can pass through the single curve smoothly.

In addition, in the case of preparing a calculation map for the target vehicle speed corresponding to the vehicle position, in the device mentioned above, it becomes necessary to calculate the target vehicle speed corresponding to the position represented by latitude and longitude, thus requiring a three-dimensional calculation map. For this reason, the calculation of the target vehicle speed results to be complicated. On the other hand, in the embodiment described above, the reference point Pc# is set, and the target vehicle speed is calculated based on the distance Lvh# between the vehicle position Pvh and the reference point Pc#. Consequently, the calculation map to calculate the target vehicle speed results to be a two-dimensional calculation map of distance and vehicle speed, thereby simplifying the calculation of the target vehicle speed.

It is also possible to prepare a calculation map for the target vehicle speed corresponding to an arrival time required for the vehicle to arrive at the reference point. In this case, the speed of the vehicle is used for converting a distance to the arrival time. Accordingly, because the input value (therefore, the arrival time) to the calculation map is determined by using the vehicle speed that serves as a controlled object of the vehicle curve speed control, the control may be unstable. On the other hand, the calculation map of the target vehicle speed with respect to the distance is easy to use and capable of stabilizing the vehicle speed control.

The present invention is not limited to the embodiment described above, but may adopt various modification examples within the scope of the present invention. For example, in the embodiment described above, the acceleration operating amount Ap is taken into account by adding the modification vehicle speed Vz to the target vehicle speed Vto, as shown in FIG. 8. Instead of this, however, the acceleration operating amount Ap can be taken into account by multiplying the target vehicle speed Vto by the modification coefficient Kvz.

Figure 10:
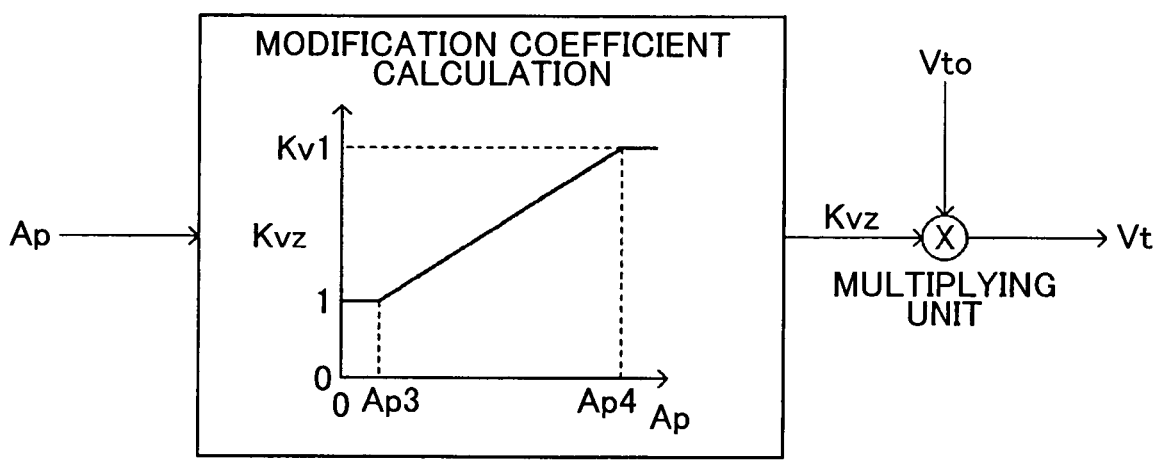
FIG. 10 is a functional block diagram for explaining calculation processing in the case of determination, by a speed control device for a vehicle according to another modification example of the embodiment of the present invention, of a target vehicle speed taking into account an accelerating operation by a driver by using a modification coefficient during the accelerating operation.

That is, as shown in FIG. 10, the modification coefficient Kvz($\geq$1) during the accelerating operation is calculated based on the acceleration operating amount Ap. The modification coefficient Kvz is calculated to be "1" if the acceleration operating amount Ap is equal to or less than Ap3 (predetermined value), and calculated so as to increase from "1" as the acceleration operating amount Ap increases if Ap>Ap3. In addition, by maintaining the coefficient Kvz(>1) at an upper limit value Kv1 if Ap>Ap4 (predetermined value), the same upper limit characteristics Vtm as described above can be provided for the target vehicle speed Vt. Also by using this method, the same operations and effects can be achieved as when the acceleration operating amount Ap is taken into account by adding the modification vehicle speed Vz.

Figure 8:
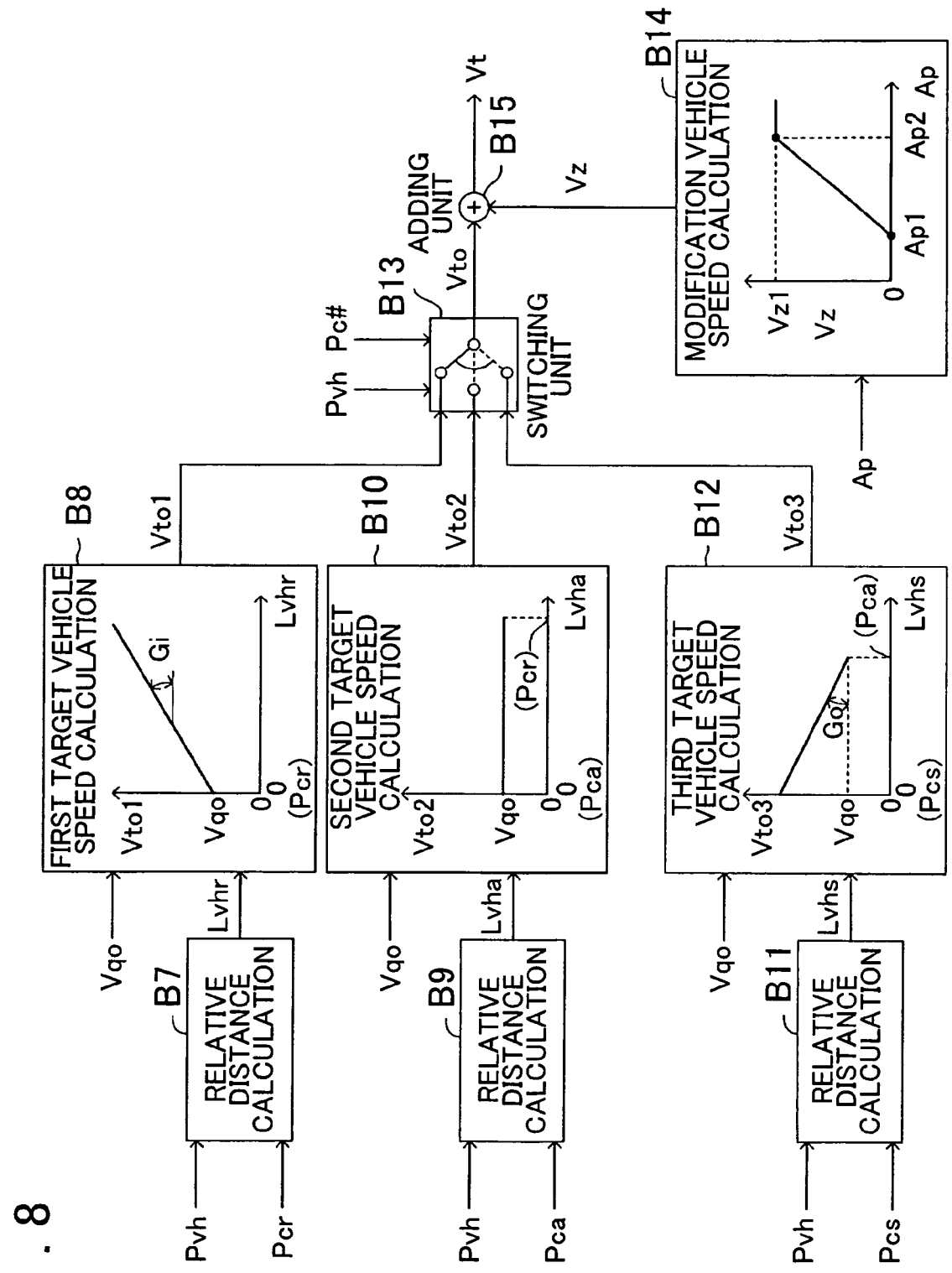
FIG. 8 is a functional block diagram for explaining specific processing concerning calculations of relative distances and calculations of target vehicle speeds, executed by the device shown in FIG. 1.

In FIGS. 8 and 10, the modification of the target vehicle speed (addition of the modification vehicle speed Vz, or multiplication by the modification coefficient Kvz) based on the acceleration operating amount Ap is applied to the target vehicle speed Vto that has been selected by the block B13 (switching unit). On the other hand, target vehicle speeds Vt1, Vt2, and Vt3 can be calculated by taking into account the acceleration operating amount Ap to modify the target vehicle speeds Vto1, Vto2, and Vto3, and then, one of these modified target vehicle speeds Vt1, Vt2, and Vt3 can be selectively determined as the target vehicle speed Vt. That is, the target vehicle speeds Vt1, Vt2, and Vt3 are calculated by adding the modification vehicle speed Vz to, or by multiplying by the modification coefficient Kvz, the target vehicle speeds Vto1, Vto2, and Vto3. In this case, the switching unit determines one of the target vehicle speeds Vt1, Vt2, and Vt3 as the target vehicle speed Vt, based on the host vehicle position Pvh and the point Pc#.

In addition, although the case in which the navigation device is used has been described above, the relative position between the vehicle and the curve (corresponding to the host vehicle position and the curve position) and the radius of curvature of the curve can be acquired from an image captured by a camera mounted on the vehicle. For example, a white line on the road, a road edge, or the like is detected based on an image captured by a stereo camera mounted on the vehicle. Then, the distance distribution of an object in the whole image can be calculated based on the displacement between positions of the same object in the stereo image and on the principle of triangulation. Based on this result, the distance from the vehicle to the curve and the radius of curvature of the curve can be obtained.

Moreover, the present invention can be used for constant speed control (automatic cruise control). In this case, the vehicle performs constant speed running at a set vehicle speed Vs set by the driver. After a curve has been recognized in front of the vehicle, the vehicle is automatically decelerated based on the characteristics of the target vehicle speed Vto1 from the point at which the vehicle speed Vx has exceeded the target vehicle speed Vto1 to the reference point Pcr. After the vehicle passes the reference point Pcr, the vehicle speed Vx is maintained at a constant vehicle speed (appropriate vehicle speed Vqo) that is appropriate for running in the curve, based on the characteristics of the target vehicle speed Vto2. After the vehicle passes the reference point Pca, the vehicle is accelerated again until the vehicle speed Vx reaches the set vehicle speed Vs, based on the characteristics of the target vehicle speed Vto3. In the case of using the present invention for the constant speed control in this manner, the acceleration control is executed to accelerate the vehicle again up to the set vehicle speed Vs, instead of executing the above-described acceleration limitation control (control from the point Pca to the point Pcs).

In the case of using the present invention for the constant speed control as described above, if the driver performs the accelerating operation, the target vehicle speed Vto (Vto1, Vto2, or Vto3) is adjusted so as to increase in response to the acceleration operating amount Ap by using the same method as described above, and the vehicle speed is controlled based on the adjusted target vehicle speed Vt. As a result, because the accelerating operation by the driver is also taken into account in the constant speed control, the uncomfortable feeling of the driver is suppressed.

Note that, if the constant speed control (automatic cruise control) is provided, the vehicle speed control unit A4 controls the vehicle speed Vx so as to coincide with the target vehicle speed Vt. On the other hand, if the constant speed control (automatic cruise control) is not provided, the vehicle speed control unit A4 controls the vehicle speed Vx so as not to exceed the target vehicle speed Vt (using the target vehicle speed as an upper limit value).

What is claimed is:

1. A speed control device for a vehicle, comprising:
   a vehicle speed acquiring unit that acquires a speed of the vehicle;
   a vehicle position acquiring unit that acquires a position of the vehicle;
   a curve acquiring unit that acquires a single curve located in front of the vehicle, inclusive of a shape and position of the single curve, the single curve having a curve entry point and a curve exit point;
   a reference point setting unit that determines a section of the single curve having a constant radius of curvature, extending from a start point to an end point, and sets, on the acquired single curve, a first reference point within the single curve based on the section start point and a second reference point within the single curve based on the section end point and nearer to the curve exit point than the first reference point;
   a distance calculating unit that calculates, based on the vehicle position and the first reference point, a first distance serving as a distance of an interval between the vehicle and the first reference point, and also calculates, based on the vehicle position and the second reference point, a second distance serving as a distance of an interval between the vehicle and the second reference point;
   a target vehicle speed determination unit that determines a first target vehicle speed based on the curve shape and the first distance, and a second target vehicle speed based on the curve shape and the second distance, determines the first target vehicle speed as a target vehicle speed until the vehicle passes the first reference point, and determines the second target vehicle speed as the target vehicle speed after the vehicle passes the first reference point; and
   a vehicle speed control unit that controls the speed of the vehicle based on the target vehicle speed and the speed of the vehicle.

2. The speed control device for a vehicle according to claim 1, wherein
   the target vehicle speed determination unit is structured so as to determine the first target vehicle speed so as to decrease as the first distance decreases.

3. The speed control device for a vehicle according to claim 1, wherein
   the target vehicle speed determination unit is structured so as to determine the second target vehicle speed so as to be constant at an appropriate vehicle speed required for the vehicle to appropriately pass through the curve, regardless of the second distance.

4. The speed control device for a vehicle according to claim 1, wherein:
   the reference point setting unit is structured so as to set, based on the curve shape and the curve position, a third reference point within the curve and nearer to the curve exit point than the second reference point;
   the distance calculating unit is structured so as to calculate, based on the vehicle position and the third reference point, a third distance serving as a distance of an interval between the vehicle and the third reference point; and
   the target vehicle speed determination unit is structured so as to determine a third target vehicle speed based on the curve shape and the third distance and to determine the third target vehicle speed as the target vehicle speed after the vehicle passes the second reference point.

5. The speed control device for a vehicle according to claim 4, wherein
   the target vehicle speed determination unit is structured so as to determine the third target vehicle speed so as to increase as the third distance decreases.

6. The speed control device according to claim 4 wherein the single curve, between the curve entry point and the curve exit point, is divided into four intervals by the first, second, and third reference points.

7. The speed control device for a vehicle according to claim 1, further comprising:
   an acceleration operating amount acquiring unit that acquires an operating amount of an acceleration operating member operated by a driver of the vehicle, wherein
   the target vehicle speed determination unit includes an adjusting unit that adjusts, based on the operating amount, the target vehicle speed so as to be larger when the operating amount is greater than zero than the target vehicle speed when the operating amount is zero.

8. The speed control device for a vehicle according to claim 7, wherein
   the target vehicle speed determination unit is structured so as to determine the target vehicle speed so that an increment from the target vehicle speed when the operating amount is zero does not exceed a predetermined upper limit.

9. The speed control device according to claim 1 wherein the single curve, between the curve entry point and the curve exit point, is divided into at least three intervals by the first and second reference points.

10. the speed control device according to claim 1 wherein the single curve, between the curve entry point and the curve exit point, is divided into at least three intervals by the start point and the end point of the section of the single curve having a constant radius of curvature and wherein the radius of curvature of the single curve decreases in the interval extending from the curve entry point to the start point, remains constant in the interval extending from the start point to the end point, and increases from the end point to the curve exit point.

11. The speed control device according to claim 1 wherein the single curve, inclusive of its shape and position, is acquired from stored map information.

12. The speed control device according to claim 1 wherein the first reference point is a point at which the vehicle completes deceleration and starts to maintain speed within the single curve and the second reference point is a point at which the vehicle completes the maintaining of speed.

13. The speed control device according to claim 1 wherein the first reference point is set between the section start point and the curve entry point, at a distance from the section start point based on a speed calculated for stable traverse of the section with a constant radius of curvature.

* * * * *